United States Patent
Amir et al.

(10) Patent No.: US 8,181,210 B2
(45) Date of Patent: May 15, 2012

(54) METHOD FOR DELIVERY OF DEADLINE-DRIVEN CONTENT FLOWS OVER A FLOW TRANSPORT SYSTEM THAT INTERFACES WITH A FLOW DELIVERY SYSTEM VIA A SELECTED GATEWAY

(75) Inventors: Yair Amir, Bethesda, MD (US); Michal Miskin-Amir, Bethesda, MD (US); Yousef Javadi, Potomac, MD (US); Malik Khan, Bethesda, MD (US); Jonathan Stanton, Chevy Chase, MD (US)

(73) Assignee: Livetimenet, Inc., Potomac, MD (US)

( * ) Notice: Subject to any disclaimer, the term of this patent is extended or adjusted under 35 U.S.C. 154(b) by 0 days.

(21) Appl. No.: 12/537,582

(22) Filed: Aug. 7, 2009

(65) Prior Publication Data
US 2010/0037265 A1 Feb. 11, 2010

Related U.S. Application Data

(60) Provisional application No. 61/086,987, filed on Aug. 7, 2008, provisional application No. 61/140,065, filed on Dec. 22, 2008, provisional application No. 61/166,459, filed on Apr. 3, 2009.

(51) Int. Cl.
| H04N 7/173 | (2006.01) |
| G06F 15/173 | (2006.01) |
| G06F 15/16 | (2006.01) |
| H04L 12/28 | (2006.01) |
| H04N 7/16 | (2006.01) |

(52) U.S. Cl. .......... 725/98; 725/118; 709/238; 709/249; 370/351

(58) Field of Classification Search .................. 725/119, 725/109, 91, 118, 98; 709/238, 249; 370/351
See application file for complete search history.

(56) References Cited

U.S. PATENT DOCUMENTS
5,892,910 A * 4/1999 Safadi ........................ 709/217
(Continued)

OTHER PUBLICATIONS

"Parallel Overlays for High Data-Rate Multicast Data Transfer" (Computer Networks: The International Journal of Computer and Telecommunications Networking, vol. 51, issue 1, pp. 31-42) (K.K. To and Jack Y.B. Lee) (Jan. 17, 2007).*

(Continued)

*Primary Examiner* — James R Sheleheda
(74) *Attorney, Agent, or Firm* — Venable LLP; Robert S. Babayi

(57) ABSTRACT

The present invention relates to a system and method that delivers content from one or more content sources to a plurality of subscriber units via a flow transport subsystem that transports content flows originated from the one or more content sources over a wide area network in response to one or more requests for deadline-driven content flows. E.g., live or interactive flows. One or more gateways interface with the flow transport subsystem for receiving the deadline-driven content flows. Each of the one or more gateways is associated with one or more subscriber units and is selected based on one or more requests for deadline-driven content flows. A content processor converts the deadline-driven content flows to modulated content flows, and a flow delivery subsystem delivers the modulated content flows to one or more subscriber units associated with a selected gateway over an allocated frequency bandwidth of one or more transmission mediums. The flow delivery subsystem delivers the modulated content flows only to those one or more subscriber units that generate one or more content requests which initiate the one or more requests for deadline-driven content flows.

41 Claims, 8 Drawing Sheets

U.S. PATENT DOCUMENTS

| | | | |
|---|---|---|---|
| 7,289,520 B2* | 10/2007 | Xu et al. ......................... 370/400 |
| 2005/0289623 A1 | 12/2005 | Midani et al. |
| 2007/0162945 A1* | 7/2007 | Mills ............................. 725/119 |
| 2008/0098450 A1 | 4/2008 | Wu et al. |

OTHER PUBLICATIONS

"A Cooperative Routing Method for Multiple Overlay Networks" (Consumer Communications and Networking Conference, Jan. 10-13, 2009, CCNC, 6th IEEE).*

* cited by examiner

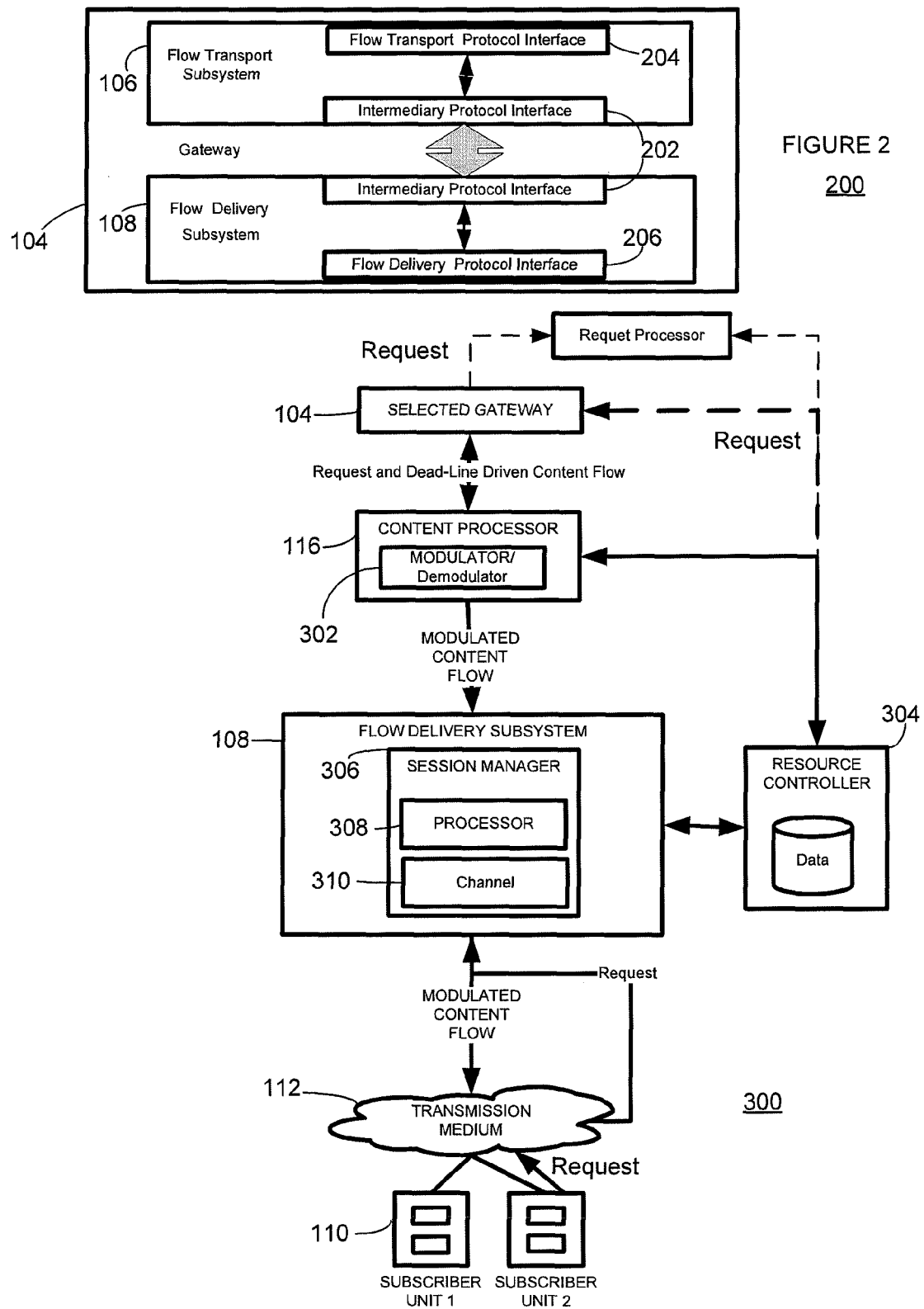

METHOD FOR DELIVERY OF DEADLINE-DRIVEN CONTENT FLOWS OVER A FLOW TRANSPORT SYSTEM THAT INTERFACES WITH A FLOW DELIVERY SYSTEM VIA A SELECTED GATEWAY

RELATED APPLICATIONS

This non-provisional application incorporates by reference the following provisional applications in their entirety: Provisional Application Ser. No. 61/082,270, filed Jul. 21, 2008; Provisional Application Ser. No. 61/086,987, filed Aug. 7, 2008; Provisional Application Ser. No. 61/140,065, filed Dec. 22, 2008; and Provisional Application Ser. No. 61/166,459, filed Apr. 3, 2009 and non-Provisional Application Ser. No. 12/506,725, filed: Jul. 21, 2009.

THE INVENTION

The present invention generally relates to the field of content delivery and more particularly to selective delivery of content to subscribers.

BACKGROUND OF THE INVENTION

Most TV content is transported over the wide-area network by satellite. Content owners and broadcasters feed their live and stored programming into earth stations which uplink the programs over radio frequencies to transponders in satellites, which then broadcast over wide geographic areas (the entire footprint of the satellite). Receiving satellite dishes receive the transmission of the program at cable, telco and other television delivery head-ends. This programming is then transformed into signaling that the existing television delivery infrastructure can transmit and deliver to the home. In addition to providing wide-area feeds to telco, cable and other customers, there are other satellites which provide direct broadcast capability to home satellite dishes (DTH). Both of these forms of satellite transport have the advantage of being a point-to-multipoint system that can efficiently deliver programming to a large number of geographically dispersed subscribers. Both satellite systems however, also have capacity and cost constraints in terms of transmitting a large number of channels. For example, satellite-based transmission is constrained by virtue of limited spectrum available for transmission between ground stations and the satellites, as well as the power that can be packaged into a satellite in space. Also, the number of satellites is limited by cost, launch capability, and available orbits and the number of transponders per satellite is constrained. As a result, all satellite distribution has been for bundled packages with a small number of channels that have very high viewership. Furthermore, satellite video distribution systems only allows for very limited interactivity due to the power and cost required for uplink transmission. As a result, satellite broadcast is often accompanied by a terrestrial return path.

IPTV is a term for television distribution over a private IP network. The implementation of IPTV can take many forms:
An end-to-end IPTV solution where programming is carried over an IP network from the content source to the subscribers home;
IPTV can be an IP segment in an overall system that may consist of satellite, fiber, coax and IPTV;
IPTV can also be used as a subsystem to deliver limited content, such as video on demand;
IPTV removes some of the capacity and interactivity constraints inherent in satellite transmission. IPTV is generally delivered over a private IP network owned by either telecom carriers or cable companies. As a private network it can be viewed as a "walled garden" such that ingress and egress to the network are controlled directly by the carrier who owns the network. No content other than the carrier's content is allowed on the network. The benefit is that contention on the network can be controlled and managed by the carrier simply by allowing or disallowing what appears on the network (it is not a shared facility). Also, as a private network, it offers a more secure and managed form of transport.

IPTV has not been deployed widely because of cost. Since it is a private network, the telecom carrier or cable company has to incur the cost of creating and maintaining a dedicated IP network. The network has to be built for peak capacity, so that peak capacity then creates a hard constraint on the number of channels that can be offered. If that telco or cable provider is providing Internet service as well as TV, they may need to have two separate IP networks in order to prevent contention. Content providers may typically have to have private links into the IPTV network in order to distribute their content. Finally, a major cost constraint for IPTV to the home is the need for a new set top box.

Hybrid Fiber Coax (HFC) networks are used by both cable and telco television systems to deliver television programming to the home. HFC consists of a fiber and a coax segment where programming comes to a fiber node and is then distributed over several coax loops to different sets of individual homes. Each coax segment has a limited amount of frequency available for broadcast television. Typical frequency ranges can be between 50 and 500 Mhz. Newer systems are capable of going up to 1 Ghz. Digital or analog television programming consumes a certain amount of frequency per stream, which limits the number of linear channels that can be delivered to the home.

An alternative to HFC distribution is Fiber-to-the-Home (FTTH), in this system the fiber node is the individual home, and coax loops are used only inside the home and start at the fiber termination. This implementation removes some of the frequency constraints in coax delivery. FTTH implementation is expensive, and an example of this in the US is Verizon's FIOS network. Even with FTTH, the home network is still coaxial and still has the linear programming constraints that the coax cable has. Also, neither HFC nor FTTH have the capability of carrying tens of thousands of channels to the home in a linear, always on fashion.

Switched Digital Video (SDV) is a technology for distributing television programming to the home on demand. Using SDV, a telco or cable carrier delivers a specific television program to the end subscriber only when that subscriber switches to a specific channel. Unwatched channels are not sent over the HFC or FTTH infrastructure. SDV results in more efficient last-mile bandwidth usage. However, for linear programming, SDV still requires the originating programming to terminate at the carrier's video hub. SDV is also used to deliver stored programming like video-on-demand or pay-per-view. This content is already stored at the video hub. An inherent limitation for SDV technology is the amount of linear and stored programming available at the video hub. Hence, the efficiency gain of an SDV network is actually limited by the amount of content available at the video hub.

Switched multicast and switched unicast are both forms of switched broadcast. In a multicast environment, a subscriber wanting to watch a program already being delivered to a service group simply joins the existing switched session. Switched multicast is the basis of switched broadcast systems being deployed today. In a unicast deployment, each subscriber receives a unique program stream. The benefits of switched unicast include targeted addressable advertising and increasing personalization of content, along with other opportunities for enhancement of subscribers' viewing experiences. Switched broadcast, also known as switched digital broadcast and switched digital video, dramatically reduces the amount of network capacity required to provide subscribers with all the programs they want to watch. Switched broadcast delivers programs only when and where requested by subscribers, unlike legacy broadcast systems that deliver all programming to all subscribers, all the time.

This is accomplished, essentially, by providing a subscriber's STB (set-top box) the ability to communicate with a video hub about which program the subscriber wants to watch in real-time. However, the video hub or head-end still receives all of the content channels from the content sources, without the ability to request content from content sources on demand. For this reason all content sources must transport their content to the video hub or cable head-end. The switched broadcast system responds by delivering to the viewer's service group from the video hub or cable head-end, but not on demand from the content source, only those programs being watched by subscribers within that group, and the STB tunes to the appropriate program. In this way, the content delivery bandwidth of the video hub or cable head-end that would otherwise be needed to deliver unwatched content is reclaimed and switched broadcast offers cable operators the opportunity to expand the amount of the offered programming at the video hub, but not at the content source.

Additional bandwidth savings at the video hub or cable-end are achieved by allowing more than one subscriber within a network node, or service group, to access the same program stream, but not on demand from the content source. If a subscriber wants to watch a program that is currently being delivered to other subscribers within the same node, the new subscriber simply joins the existing switched session at the video-hub or cable head-end. As a result, no additional capacity is consumed by the incremental subscriber at the video-hub or cable head-end. This practice, known as switched multicast, is the basis of switched broadcast systems deployed today.

One of the main drawbacks of the current HFC-based video distribution systems is the lack of selectivity on the part of consumers to choose their own channels of interest directly form the source. Instead, such subscribers are at the mercy of their service providers to provide them with predetermined bundled channels from the video hub or cable head-end according to their agreements with various content providers and/or distribution partners. As a result, consumers are forced to receive content that may not be of interest to them.

Internet television refers to the delivery of television-like programming over the Internet to an Internet connected device at the consumer's home. Internet television has the advantages of scale, cost and ubiquity. The biggest constraint on Internet television is the lack of reliability and quality of service available on the Internet, since it is subject to the packet loss, jitter and delay on the physical Internet. As the Internet is a shared resource, Internet television has to contend with data, video and voice traffic on the public Internet. Another limitation on Internet television is that it is difficult to watch the programming on actual televisions because of technical and user interface challenges. One example of a weakness in the user interface is the lack of an electronic program guide. Also, you need a separate piece of consumer equipment to convert the video packets over the Internet into a television signal that is sent over standard TV cables to the television. Finally, the TV also must be switched to the appropriate input device to select this device instead of the cable set top box or a DVD player.

A specific form of Internet television is Internet video. Internet video is a term for any stored video delivered over the Internet, for example YouTube. The advantage of Internet video is on-demand programming with an almost unlimited amount of programming and easy search methods for specific videos. An advantage of Internet video over Internet television is that it can be delivered reliably by adding delay through buffering, something that is possible because the content is stored and not live. It still has the same disadvantages as other Internet television in terms of how it is displayed on the consumer's TV.

A number of new consumer premise equipment (CPE) devices have been developed that display some forms of video and audio content downloaded from the Internet onto a television. These devices each support different content formats and control methods but they all have a few characteristics in common. They all connect to the user's home network to access the Internet (over wireless 802.11 networks or physical ethernet), and connect directly to one of the TV inputs (S-Video, component cables, HDMI, etc). Some examples of these devices include Apple TV, Roku, Xbox 360, Playstation 3, and Vudu. All of these devices have the limitations described above under Internet television where they require the user to switch their TV input to access the content and they have an interface for searching and selecting content separate from the main cable television program guide. Some of these boxes have a very limited selection of content as they only support a specific set of websites or services (iTunes). These devices also require the consumer to purchase an expensive new box in order to access the content.

Therefore, there exists a need for a more efficient system and method for distribution of video that takes advantage of existing video distribution infrastructure.

SUMMARY

Briefly, according to the present invention, a system and method delivers content from one or more content sources to a plurality of subscriber units via a flow transport subsystem that transports content flows originated from the one or more content sources over a wide area network in response to one or more requests for deadline-driven content flows, e.g., live or interactive flows. One or more gateways interface with the flow transport subsystem for receiving the deadline-driven content flows. Each of the one or more gateways is associated with one or more subscriber units and is selected based on one or more requests for deadline-driven content flows. A content processor converts the deadline-driven content flows to modulated content flows, and a flow delivery subsystem delivers the modulated content flows to one or more subscriber units associated with a selected gateway over an allocated frequency bandwidth of one or more transmission mediums. The flow delivery subsystem delivers the modulated content flows only to those one or more subscriber units that generate one or more content requests, which initiate the one or more requests for deadline-driven content flows.

BRIEF DESCRIPTION OF THE DRAWINGS

FIG. 2 shows a block diagram for interfacing flow transport and flow delivery subsystems via an intermediary interface.

FIG. 3 shows a block diagram of a content flow delivery system implemented according to one aspect of the invention.

DETAILED DESCRIPTION OF THE INVENTION

As described herein, the present invention provides content generators with the ability to reach new subscribers and provide live and interactive content via deadline-driven flows to a large groups of subscribers on demand based on subscriber requests for content flows. The present invention supports dynamic channel allocation both on ingress to the system, for example in terms of satellite bandwidth, and on egress to subscriber clients, for example, in terms of coaxial frequencies to homes. Having removed such distribution constraints, the present invention allows distributors to create a cost-effective way to generate new revenue through the use of new content. As a result, the content choice of the viewing audience is flexibly increased, allowing such subscribers to request desired content on demand. In this way, video content distribution can be tailored based on subscriber needs.

The various aspects and embodiments of the present invention are described according to the following definitions:

Subscriber unit comprises a device that processes one or more modulated content flows at a subscriber location.

Content flow comprises a series of related packets communicated amongst a source node and one or more receiver node(s).

Modulated content flow comprises a signal representing a content flow modulated according to a modulation technique.

Selecting means directing a content flow to one of a plurality of destinations based on a request for the content flow from the destination.

Flow transport subsystem comprises a system that transports one or more content flows, with each content flow being transported to one or more selected gateways.

Flow delivery subsystem comprises a system that transmits one or more modulated content flows to one or more subscriber units over one or more transmission mediums.

Deadline-driven comprises a process that satisfies a temporal criteria associated with reaching a destination.

Transmission medium comprises a medium that propagates energy waves.

Gateway comprises a node for interfacing with another network that uses different protocols.

Wide area network is a computer network that covers a broad area, namely, any network whose communications links cross metropolitan, regional, or national boundaries.

Figure 1:
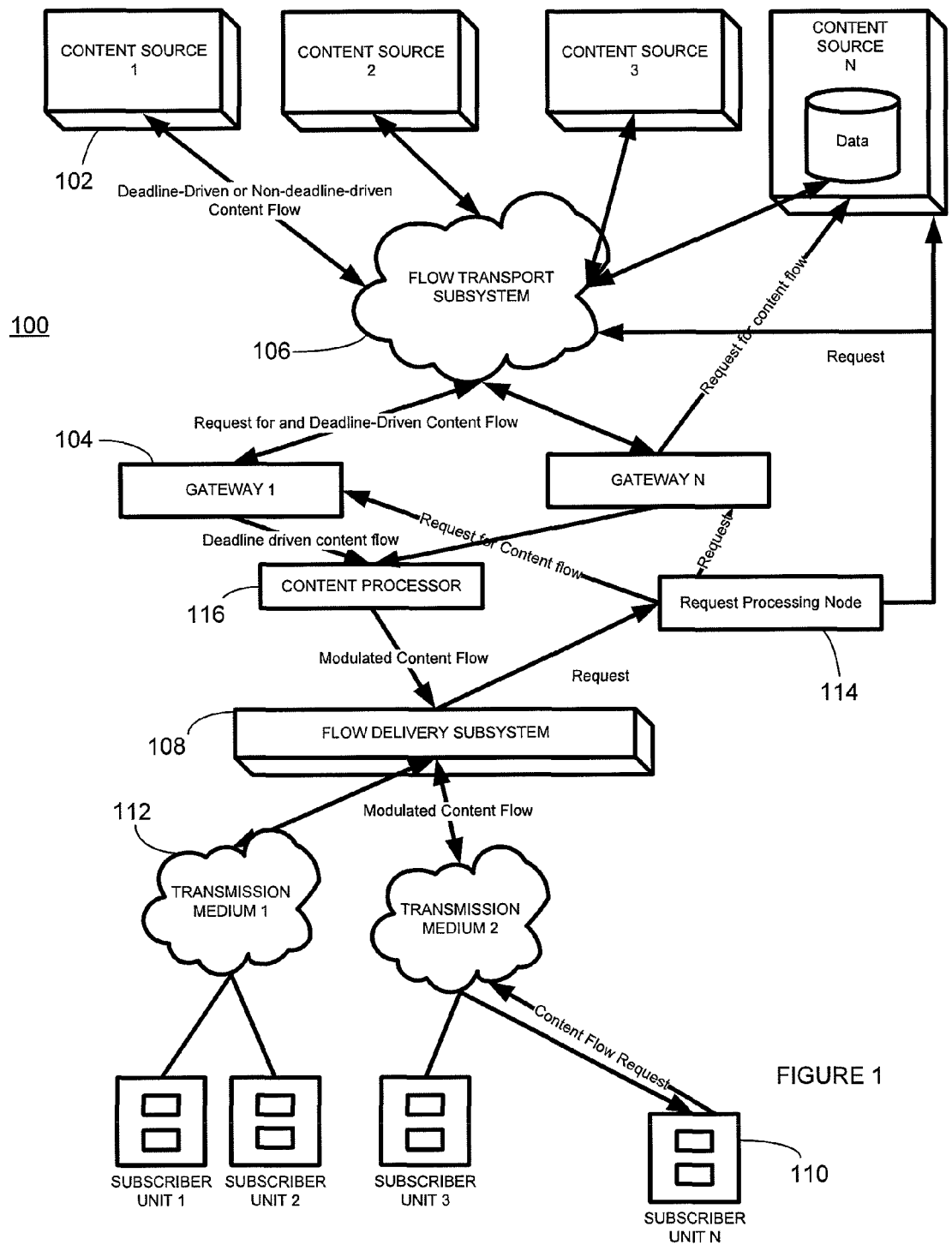
FIG. 1 shows a block diagram of a content delivery system implemented to embody various aspects of the invention.

As shown in FIG. 1, the present invention relates to a system 100 for delivery of content from one or more content sources 102 through one or more gateways 104 that interface between a flow transport subsystem 106 and a flow delivery subsystem 108 coupled to a plurality of subscriber units 110.

The content may include, for example, a digital or analog source, including live performances, video, audio, multimedia, images, documents, material, files, games, user generated content, MPEG, Internet video, SD or HD video, or movies, etc. The content originates at a content source 102 as transportable content flows over a wide area network, which supports transporting deadline-driven content flows and non-deadline driven content flows. The wide area network may comprise a geographically-distributed private network, the Internet, or a metropolitan area network (MAN).

The content source 102 is coupled, through one or more connections, to the flow transport subsystem, which supports transport of deadline-driven content flows. One such exemplary flow transport sub-system is disclosed in the non-Provisional application Ser. No. 12/506,725, filed: Jul. 21, 2009, titled "A SCALABLE FLOW TRANSPORT AND DELIVERY NETWORK AND ASSOCIATED METHODS AND SYSTEMS," which is hereby incorporated by reference. The flow transport subsystem 106 may also interface with or one or more proprietary protocols over public or proprietary networks that support deadline driven transport protocols. The flow transport subsystem 106 transports deadline-driven content flows according to one or more combinations of protocols such as but not limited to, Internet Protocol (IP), User Datagram Protocol (UDP), Transmission Control Protocol (TCP), Point-to-Point Protocol (PPP), or any multicast protocol, including IP Multicast. Content flows can also be transported over an overlay network running over an underlying IP network, such as but not limited to, the Internet.

The flow transport subsystem 106 interfaces with one or more gateways 104 that support protocol interfaces of the flow transport 104 and flow delivery subsystems 108. Each gateway 104 is associated with one or more subscriber units 110. Such association results in delivery of deadline-driven content flows to those subscriber units 110 associated with the gateway 104 that generates requests for content flows, which initiate corresponding requests for deadline-driven content according to request initiation criteria, as further described below.

As shown in FIG. 2, interface functionality of the gateway 104 may be split between the flow transport subsystem 106 and flow delivery subsystem 108 by interfacing with the flow transport subsystem 106 and the flow delivery subsystem 108 via an intermediary protocol interface 202 positioned between a flow transport protocol interface 204 and a flow delivery protocol interface 206 for exchange of messages between the flow transport subsystem 106 and the flow delivery subsystem 108. Any combination of flow transport 204, flow delivery 206 and intermediary protocol interfaces 202 may be integrated in one box or multiple boxes within or without the gateway 104. A gateway 104 may be implemented in hardware, software, or both, and may be a general purpose computer (e.g., but not limited to a server computer) or a dedicated device.

Referring back to FIG. 1, the one or more gateways 104 located within one or more geographic regions are selectable gateways 104. The gateways 104 are selected based on the initiation of requests for deadline-driven content flows within the system. In one embodiment, a gateway 104 may be selected based on a decision to initiate requests for receiving deadline-driven content flows from a content source 102 according to the request initiation criteria as further described in detail. Once selected, a gateway 104 can receive deadline-driven content flows that are requested by a subscriber unit 110 that is associated with the selected gateway 104. In one embodiment, the one or more gateways 104 are located at one or more cable head-ends or video hubs. However, the gateways 104 may be located in any suitable location that supports deadline-driven content flows.

In one embodiment, the one or more gateways 104 receive request for content flows from the subscriber units 110 and transmit requests for deadline-driven content flows over the flow transport subsystem 106 based on the request initiation criteria. For example, a gateway 104 initiates requests for deadline-driven content flows only if the selected gateway 104 has not previously issued a request for the same deadline-driven content flow. Otherwise, such request is not initiated and the requested content flow is delivered to the subscriber unit 110 by adding the requesting subscriber units 110 to the one or more subscriber units 110 that already receive the requested flow.

One or more content processors 302 convert received deadline-driven content flows at the one or more gateways 104 into modulated content flows as described in more detail. A content processor 302 may be implemented in hardware, software, or both, and may be a general purpose computer (e.g., but not limited to a server computer) or a dedicated device for implementing any version or order of frequency, phase or amplitude modulation including any one or combination of PSK, QAM, APSK, OFDM, and/or COFDM modulation.

The flow delivery subsystem 108 interfaces with the content processor 302 for transmitting modulated content flows associated with a selected gateway 104 over an allocated frequency bandwidth of one or more transmission mediums 112, which deliver the modulated content flows to the one or more subscriber units 110 associated with the selected gateway 104. An exemplary flow delivery subsystem 108 may comprise a digital video network, such as a switched digital video network. The transmission medium is coupled to one or more subscriber units 110 that are associated with a selected gateway 104. Exemplary subscriber units 110 include but are not limited to set top boxes associated with a cable system, game consoles, wired or wireless PDAs, dedicated devices, or computers.

According to one aspect of the invention, the flow delivery subsystem 108 delivers the modulated content flows only to those one or more subscriber units 110 associated with a selected gateway 104 that generate one or more content requests which initiate one or more requests for deadline-driven content flow. Such subscriber units 110 transmit content flow request to the flow delivery subsystem 108 via the one or more transmission mediums 112. The content flow requests may be requests for deadline-driven content or non-deadline-driven content. One or more of the content flow requests may be deadline-driven requests. The content flow requests are processed at a suitable request processing node within the system. The request processing node 114 may be at the gateway 104 or in a resource manager outside of the gateway 104, co-located with the gateway 104 or in another location, such as the content flow delivery subsystem 108. The request processing node 114 executes processes within the system to determine or otherwise decide whether to initiate one or more requests for deadline-driven content flows. Such or more sessions may for example comprise one or more multicast sessions.

FIG. 3 shows a block diagram of the content flow delivery subsystem 108 associated with a selected gateway 104. The selected gateway 104 receives one or more deadline-driven content flows based on one or more requests for deadline-driven content flows, which are initiated based on a content flow request from a subscriber unit 110. The selected gateway 104 interfaces with the content processor 116 which converts one or more requested deadline-driven content flows into one or more modulated content flows. The content processor 116 comprises a modem 302 for generating modulated content flows corresponding to requested deadline-driven content flows and demodulating content flow requests from those subscriber units 110 that are associated with the selected gateway 104. The modem 302 may be implemented in hardware, software, or both.

The flow delivery subsystem 108 delivers one or more modulated content flows to one or more subscriber units 110 over one or more transmission mediums 112. Exemplary transmission mediums 112 may include, but are not limited to, wire, fiber optic, wireless, coaxial, copper, twisted pair, or any combination of them (e.g., but not limited to Hybrid Fibre-Coax (HFC)), etc. In one embodiment, the transmission mediums 112 comprise a last-mile delivery network. The modulated content flows are delivered to the subscriber units 110 via one or more transmission mediums 112 over an allocated frequency bandwidth. Such frequency bandwidth can comprise any bandwidth that may be suitably modulated or otherwise channellized for delivery of the modulated content flows over one or more communication channels. The modulated content flows are delivered only to subscriber units 110 that have issued one or more content flow requests for deadline-driven content flow.

In one embodiment, a resource controller 304 associates one or more communication channels over the allocated frequency bandwidth for delivery of modulated content flows. Under this arrangement, the resource controller 304 does not allocate any new communication channel for delivery of the modulated content associated with a requested deadline-driven content flow if another communication channel is already associated with the requested content flow. The resource controller 304 allocates communication channels for delivery of the modulated content flow when a request for deadline driven content is initiated at the flow transport subsystem 106. In one embodiment, such a request is not initiated for a requested content flow from a subscriber unit if the flow delivery subsystem is already delivering the requested content flow on another allocated communication channel. The flow delivery subsystem 108 may include a session manager 306 that manages one or more multicast communication sessions for delivering one or more modulated content flows to a group of subscriber units associated with the selected gateway 104 simultaneously via a processor block 308 that among other things adds or deletes subscriber units 110 to the group and a channel block 310 that creates or removes the communication channels based on information received from the resource controller 304. The resource controller 304 may be responsible for initiation of the requests for deadline-driven content flows. The resource controller 304 may also signal another node within the system, such as the selected gateway 104, to initiate such request. Indeed, the resource controller 304 may be signaled to process communication channel allocations after a request for deadline-driven content flow is initiated. Such signal may be received from the selected gateway 104 or a non-selected gateway 104.

Figure 4:
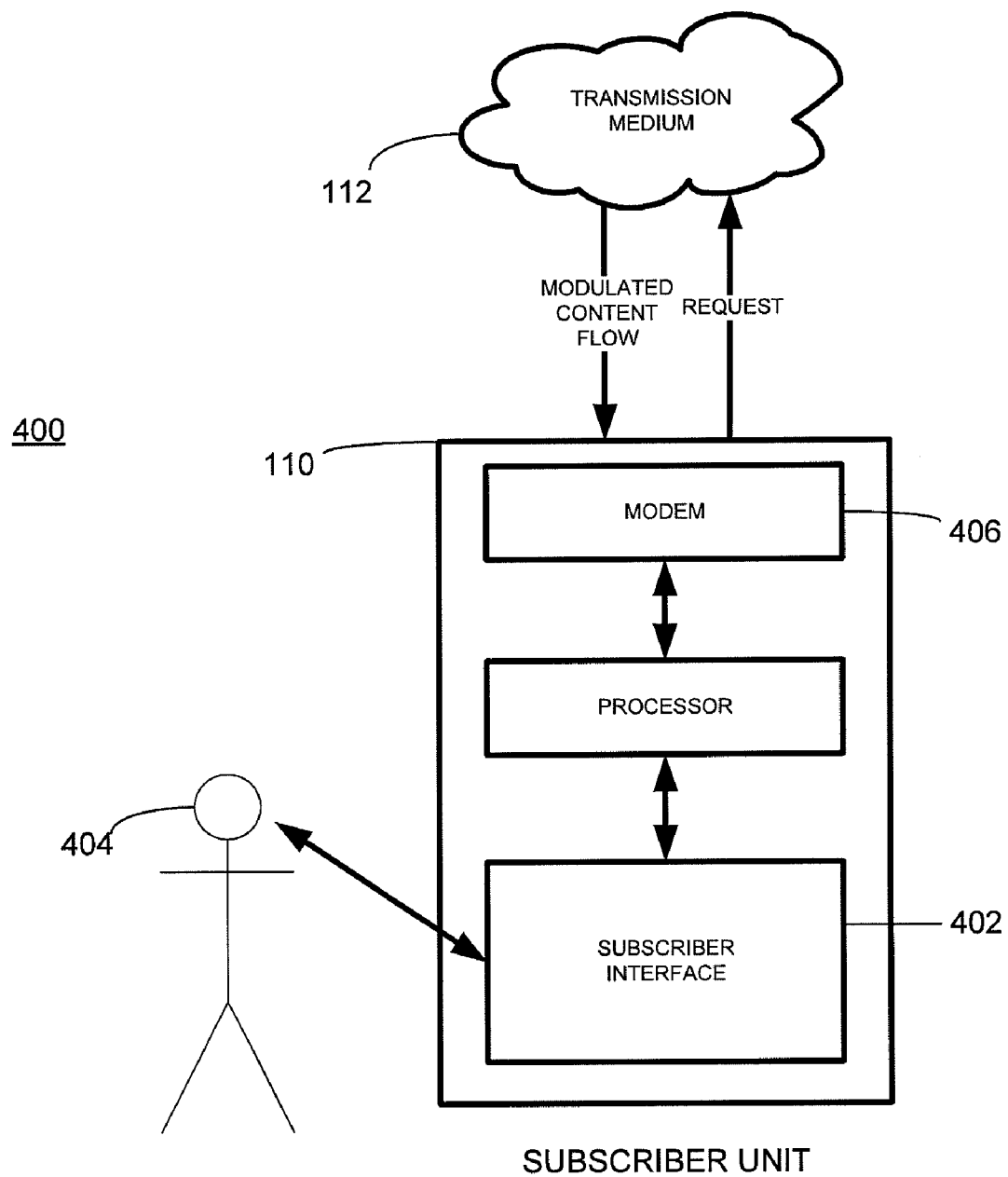
FIG. 4 shows a block diagram of a subscriber unit implemented according to another aspect the invention.

FIG. 4 is a block diagram of a subscriber unit 110. The subscriber unit 110 provides a subscriber interface 402, which allows a subscriber 404 to select programs associated with a deadline-driven content source. The subscriber unit 110 receives delivered modulated content flow over the transmission medium 112. A modem 406 (i.e., modulator-demodulator) demodulates the modulated content flow and modulates content flow requests for transmission to the flow delivery subsystem 108 over the one or more transmission mediums 112. The subscriber interface 402 may also include a human to machine interface such as a graphical user interface. The subscriber interface 402 allows the subscriber 404 to input requests for selected programming associated with a content source 102 and receive an output in text, audio, video, game, image, or multimedia format. A subscriber can also interface with the subscriber unit 110 via a remote control (e.g., infrared, radio signals, etc.), a pointing device (e.g., mouse, trackball, touchpad, touchscreen, etc.), a keyboard, or other device.

One example of the present invention is implemented as a system and method that selectively delivers Internet video or other Internet media content for viewing directly through subscriber television or cable set-top box via the existing HFC infrastructure without the need for a CPE. More specifically, the present invention couples Internet video to a cable video modulation device, such as an EdgeQAM device, either directly or indirectly, e.g., via a router or a video processor, which is then outputted to a subscriber set-top box, as a TV signal, to facilitate selective distribution of live or stored video over existing HFC infrastructure. In this way, the present invention modulates the Internet video signal on a frequency channel that carries the existing cable TV signals on the coaxial connection between the QAM modulator and the set-top box, but not on the cable modem.

Although this example uses the EdgeQAM modulated channels, for delivery of Internet video on current HFC infrastructure, any type of current or future modulation or channelization techniques that is compatible with the delivery of cable TV/video signals to set-top boxes can be used, including but not limited to any versions of QPSK, QAM, PSK, APSK, OFDM or COFDM.

This implementation differs from known ways of transporting television programming over the wide-area network. As opposed to satellite or IPTV delivery of television content, this implementation uses a Video Delivery Network (VDN), which can operate over the public Internet and is able to take advantage of the capacity, ubiquity and cost of the public Internet while providing high reliability and quality. Additionally, this invention selectively delivers content from the VDN to subscriber units on demand, and only on demand to the HFC infrastructure, thus eliminating the need to linearly process, encrypt and deliver all of the channels all of the time.

This example creates the ability to use the existing HFC or FTTH delivery network and delivers Internet based television content over that infrastructure. Second, the implementation increases the bandwidth efficiency of HFC and FTTH delivery networks by delivering on-demand a very large number of Internet television channels over the same physical HFC infrastructure. Essentially, by making a large amount of content available, the implementation greatly magnifies the benefit of SDV. Compared to Internet television, this example allows the Internet television content to be delivered directly and naturally to the subscriber' television set. In so doing, it obviates the requirement for a dedicated device, as well as alleviating any concerns about contention over the last mile.

The system differs from known ways of modulating Internet video signals into a TV signal. As stated above, one existing technique requires the use of a consumer device or CPE, such as an Apple TV or Roku, that is attached to the home network of the subscriber and to one of the input ports on the viewer's home television. In this case, the modulation and conversion of the Internet video signal to a television signal is done by a dedicated consumer device in their home. In contrast, the conversion/modulation according to the claimed invention is done inside the HFC cable infrastructure and has the signal arrive at the home as one of the TV channels available through the subscribers existing set-top box. Thus, no additional consumer device is required and the signal is delivered as part of the existing TV channel lineup and does not require switching the physical TV to a different input port.

Another existing method involves a new version of the EdgeQAM devices installed in the cable head-end or video hub. One example is the "Direct-2-Edge" device offered by Harmonic. Such a device takes an Internet video signal into the EdgeQAM and modulate it into a QAM signal that is then output over the cable modem output, but not cable set-top box output. From the EdgeQAM device, Internet video is delivered to the cable modem device at the subscribers home to be viewed by the subscriber on their PC or other computing device.

Figure 5:
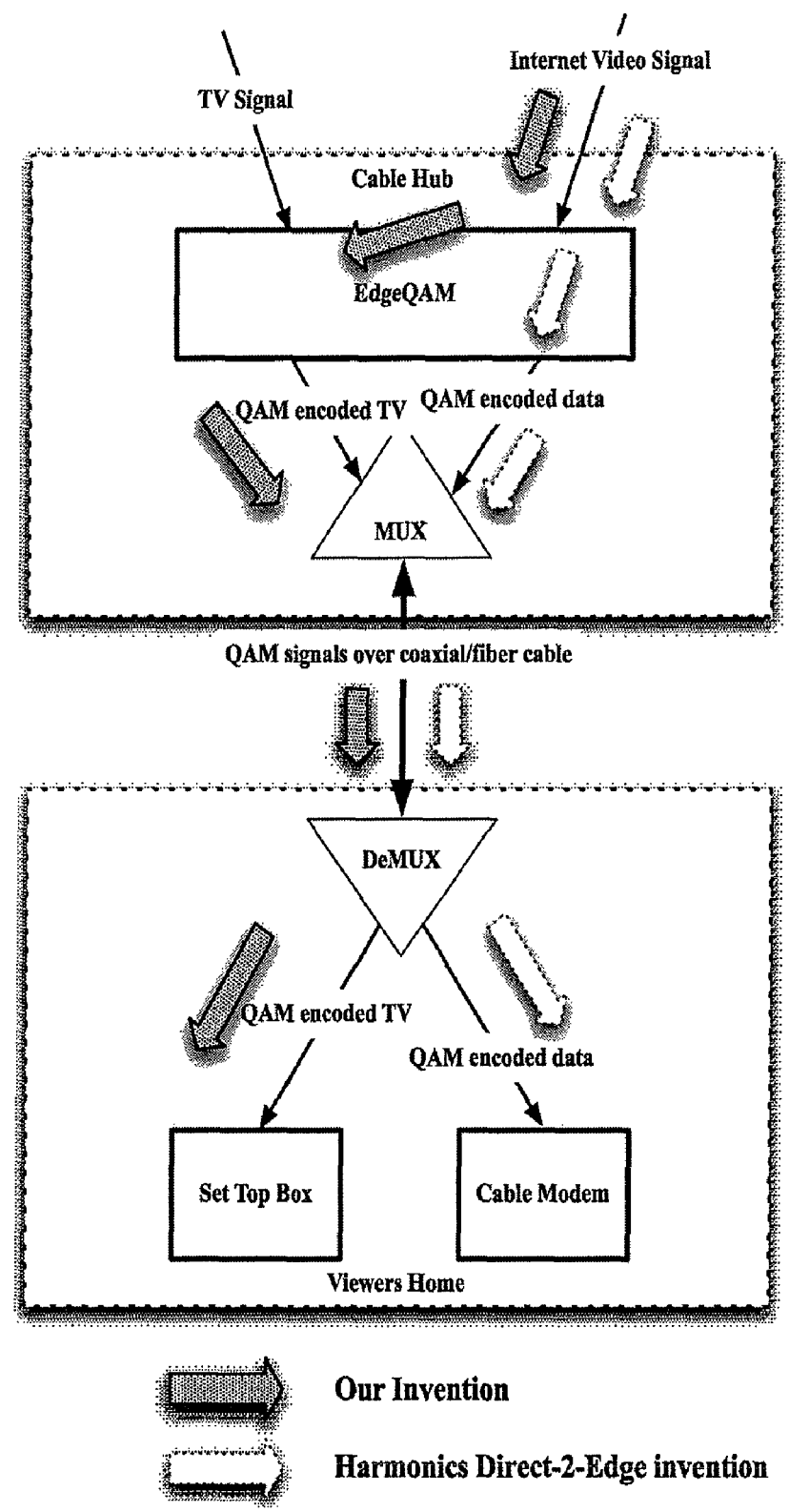
FIG. 5 shows a diagram for an example of transporting Internet Video over QAM TV or QAM data over the system of FIG. 1.

As shown in FIG. 5, this technique differs from the present invention because the Internet video signal is output onto the cable modem frequencies and not as a video signal modulated on the frequency of the cable that connects the Internet video signal to the set-top box.

Figure 6:
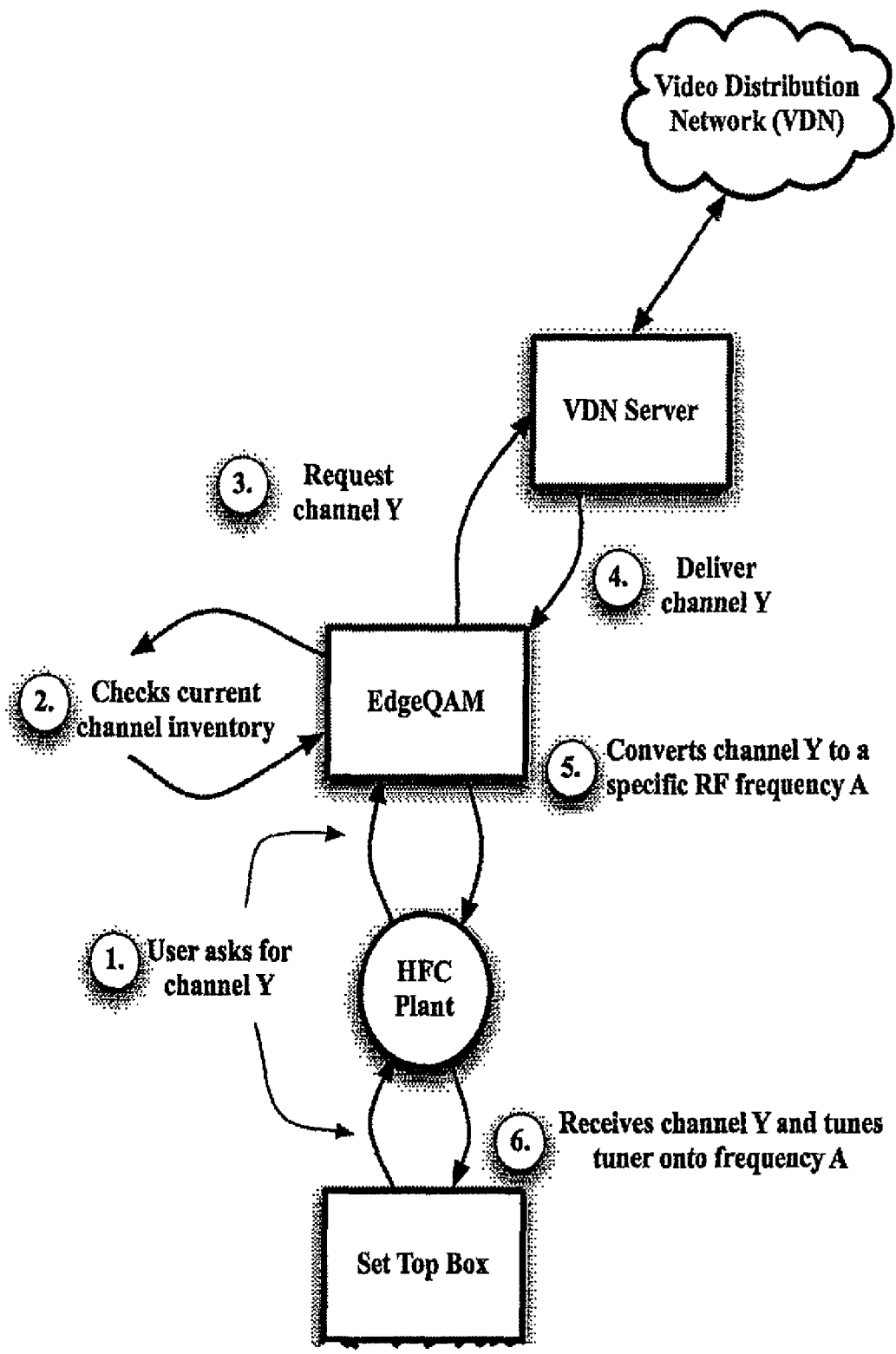
FIG. 6 shows a diagram for distributing user selected channels.

Selective Video Distribution Using QAM Channels:

FIG. 6 shows a block diagram of one example for selective distribution of video channels to subscriber subscribers. This selective video distribution system and method creates two main changes in the way video is distributed through a head-end. First, the head-end does not receive all of the potential channels all of the time, but only receives those channels from a Video Distribution Network (VDN) that local subscribers are currently watching. Thus, video processors, encrypters, and other components of the head-end do not have to process the channels that no one is currently watching. Second, the channels are dynamically assigned to frequencies and different set-top boxes can receive different channel content through the same channel selector on an interactive program guide (iPG).

More specifically, the selective distribution of video according to one aspect of the present invention is accomplished by providing a system and method where the subscriber selects a VDN channel to view via a subscriber interface with the set-top box (scrolling, entering a code or using a search routine) and then a resource manager and/or the EdgeQAM determines whether this program is already being watched by someone in their system. If so, they would add the subscriber's STB to the multicast group in the same way as they would for SDV or VoD. If not, the EdgeQAM or the Resource Manager will signal to the VDN server through a "Join" or "Request" message what specific video content should be requested from the VDN. The VDN then begins a unicast or multicast stream of the requested channel to the appropriate device in the cable infrastructure (for example, a head-end device, a video hub, etc.). Therefore, in one embodiment, multicast with a join/leave subscription model is utilized in two different ways: first, with the EdgeQAMs which unicast or multicast video channels to one or many STBs, and second, with the VDN which multicasts video channels from their original source to all of the head-end sites that currently need that specific channel.

In another embodiment, the EdgeQAM device receives the information and checks for the availability of content. If the content is available, then the EdgeQAM allocates a channel and frequency as an identifier. This identifier is used to enable communication between the VDN server and the EdgeQAM on that content.

Figure 7:
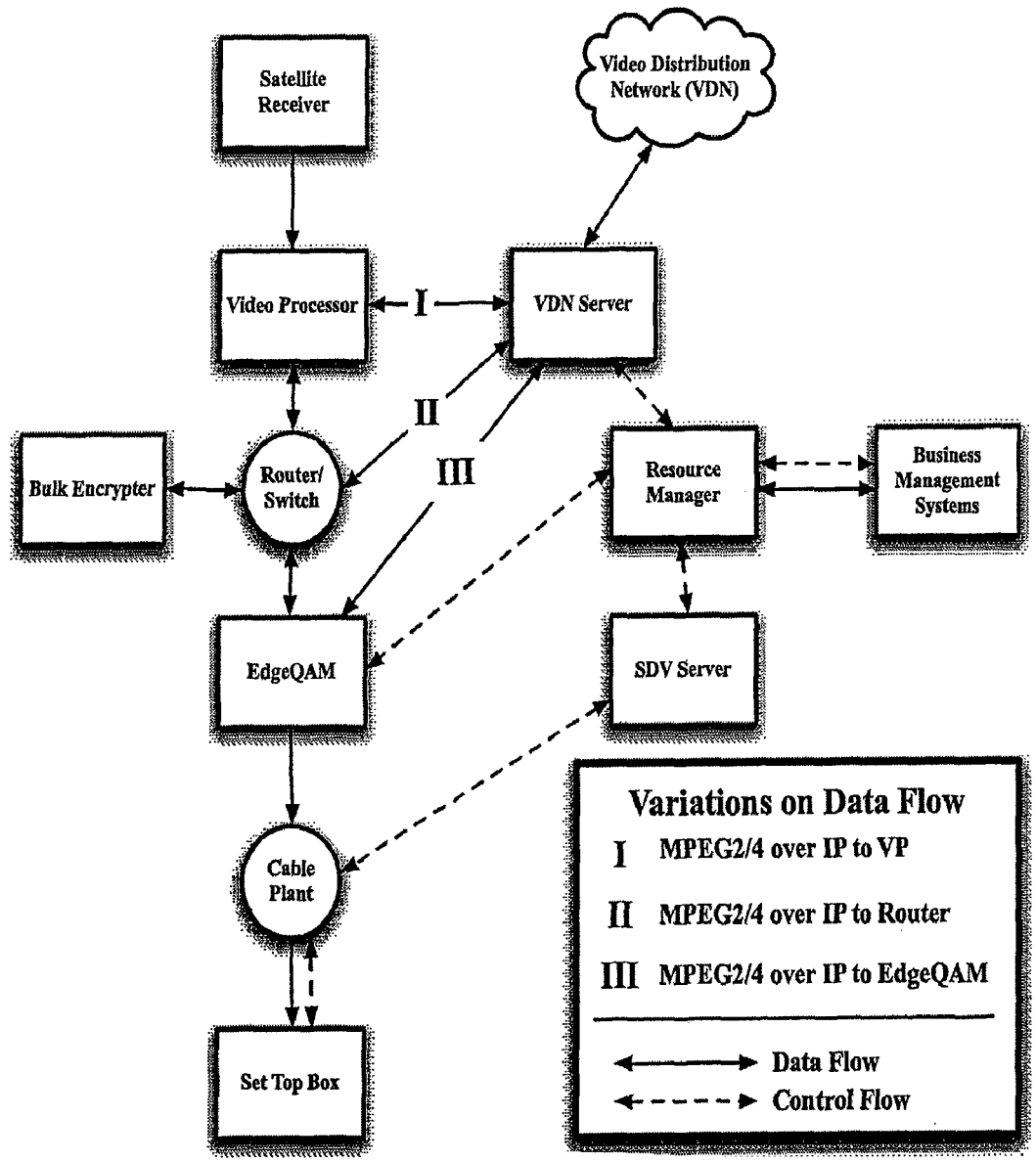
FIG. 7 shows exemplary components of a video distribution system according to one embodiment of the invention.

FIG. 7 shows the block diagram of a selective video system according to one embodiment of the present invention, depicting the flow of both data and control information. STB is a standard set-top box with a switched digital video client, capable of tuning to the frequency set by the switched digital video management system to receive requested programming. Video Distribution Network (VDN) is a network that delivers video streams from the original content source to the head-end or video hub sites. SDV Server is a standard switched digital video server that communicates with the STB as well as other components to ensure delivery of subscriber chosen programming. Resource Manager is a server that has access to available system resources and can make decisions on where to source requested programming and how to deliver it to the STB. Business Management includes all the sub-systems necessary to identify, authenticate, administer, report and bill individual subscribers for requested program consumption. EdgeQAM is a device capable of converting a requested MPEG4/H.264 flow over IP/GbE into a specific RF frequency for unicast or multicast transmission over the hybrid fiber-coax plant to the STB. Router/Switch is a networking device capable of routing and switching IP packets from a given source to a given destination. Bulk Encrypter is an information processing device capable of encrypting video streams and multicasting the encrypted flows to EdgeQAMs. Video Processor is an information processing device capable of processing a video or other media flow from the VDN Server into the format required by the switched digital video infrastructure of the video delivery system. VDN Server is a device that delivers requested programming from the VDN core network.

The following describes the flow of control signals in the exemplary embodiment of FIG. 7:

1. The television service provider allocates certain channels on the STB for VDN programming content.
2. A VDN interactive program guide (iPG) is shown on these allocated channels when no specific program has been requested.
3. Subscribers can use the iPG interface (whether by simply scrolling through a set of choices or using a search method) to find a program they wish to watch and then click on a live or available program to select it.
4. The STB signals this choice to the SDV server.
5. The SDV server requests resources for this program from the Resource Manager.
6. The Resource Manager authenticates the requesting subscriber and checks whether this program has been previously requested by any other subscriber in any service group or area
    a. If the program is already being delivered to another subscriber, the Resource Manager will inform the appropriate EdgeQAM to deliver the program on a specific frequency and will then signal the frequency to the SDV Server which will, in turn, inform the STB which frequency to tune to for the program.
    b. If the program is not currently being delivered to any other subscriber, the Resource Manager will signal to the VDN Server to deliver the requested program to the Video Processor.
        i. This signaling can occur in multiple ways (shown in Variations in the System section below)
            1. Resource Manager signals VDN Server directly
            2. Resource Manager signals the EdgeQAM that then signals the VDN Server through the router/switch
            3. Resource Manager signals the EdgeQAM that then signals the VDN Server directly
7. When the program is no longer being viewed by the requesting subscriber, the SDV Server will inform the Resource Manager which will then reclaim the allocated frequency for the next request.
8. When a particular program is no longer being viewed by any subscriber on the system, the Resource Manager will signal to the VDN Server (in the multiple possible ways outlined in 6a) to take that program out of service and not deliver it to the cable/telco infrastructure until another request is received for this program.
9. When a program is added or deleted by the VDN Server, and/or when a program is requested or sent or terminated to a requesting subscriber, the Resource Manager communicates these events to the Business Management System for security, authentication, administration and billing.

Media flow according to an exemplary embodiment of the information is as follows:

1. When ordered to do so, the VDN Server unicasts a requested program to the Video Processor.
2. The Video Processor will process the ingested program, convert the media into a form compatible with the service provider's infrastructure, insert advertising or other content into the program, and will optionally store the program for interactive applications like record, rewind, pause, etc.
    a. If the program needs to be encrypted, the Video Processor will unicast it to the Bulk Encrypter through the Router/Switch.
    b. If the program does not need to be encrypted, the Video processor will multicast it to the EdgeQAMs through the Router/Switch.
3. The Bulk Encrypter will encrypt the VDN program and multicast it to the EdgeQAMs.
4. The EdgeQAM will modulate the requested VDN program into RF using quadrature amplitude modulation (QAM) and send it on to the hybrid fiber-coax plant for delivery to the requesting STB(s)
    a. If there is only one requesting subscriber in its service group, the EdgeQAM will unicast the program to the specific STB.
    b. If there is more than one requesting subscriber in its service group, the EdgeQAM will multicast the program to all requesting STBs.
5. The STB will tune to the appropriate frequency and deliver the program to the requesting viewer.

Figure 8:
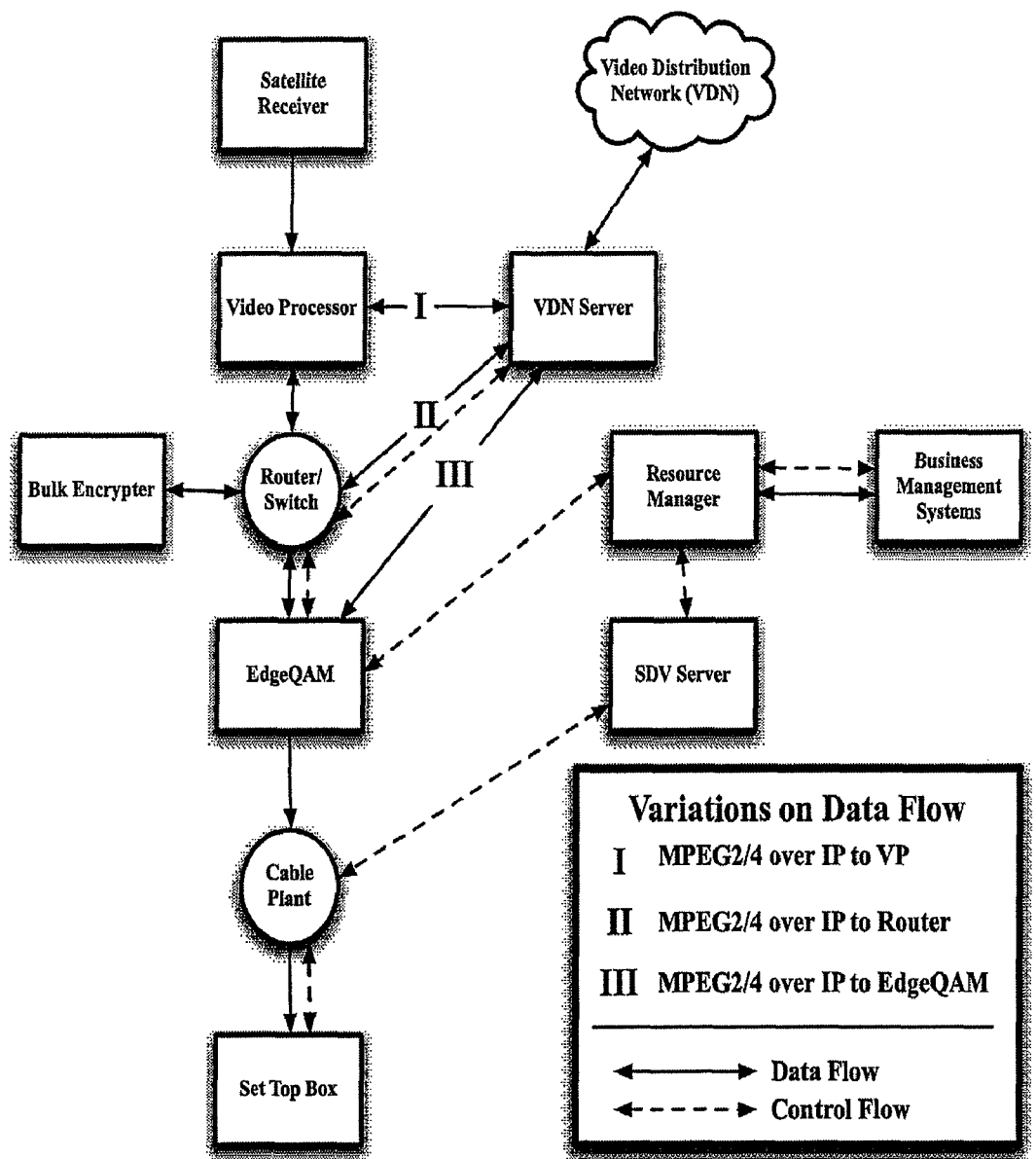
FIG. 8 shows exemplary components of a video distribution system according to another embodiment of the invention.

FIG. 8 shows an embodiment where the VDN Server negotiates with the EdgeQAM through the router/switch. According to this embodiment, the VDN server relies on the EdgeQAM to negotiate with the Resource Manager regarding which video content or media flow is requested from the large potential set of video content sources available through the VDN. Having received this request, the EdgeQAM allocates an identifier to the requested content and asks the VDN to deliver to it the content associated with that identifier. The communication between the VDN server and the EdgeQAM regarding that request and allocation is communicated over IP through the router/switch.

Figure 9:
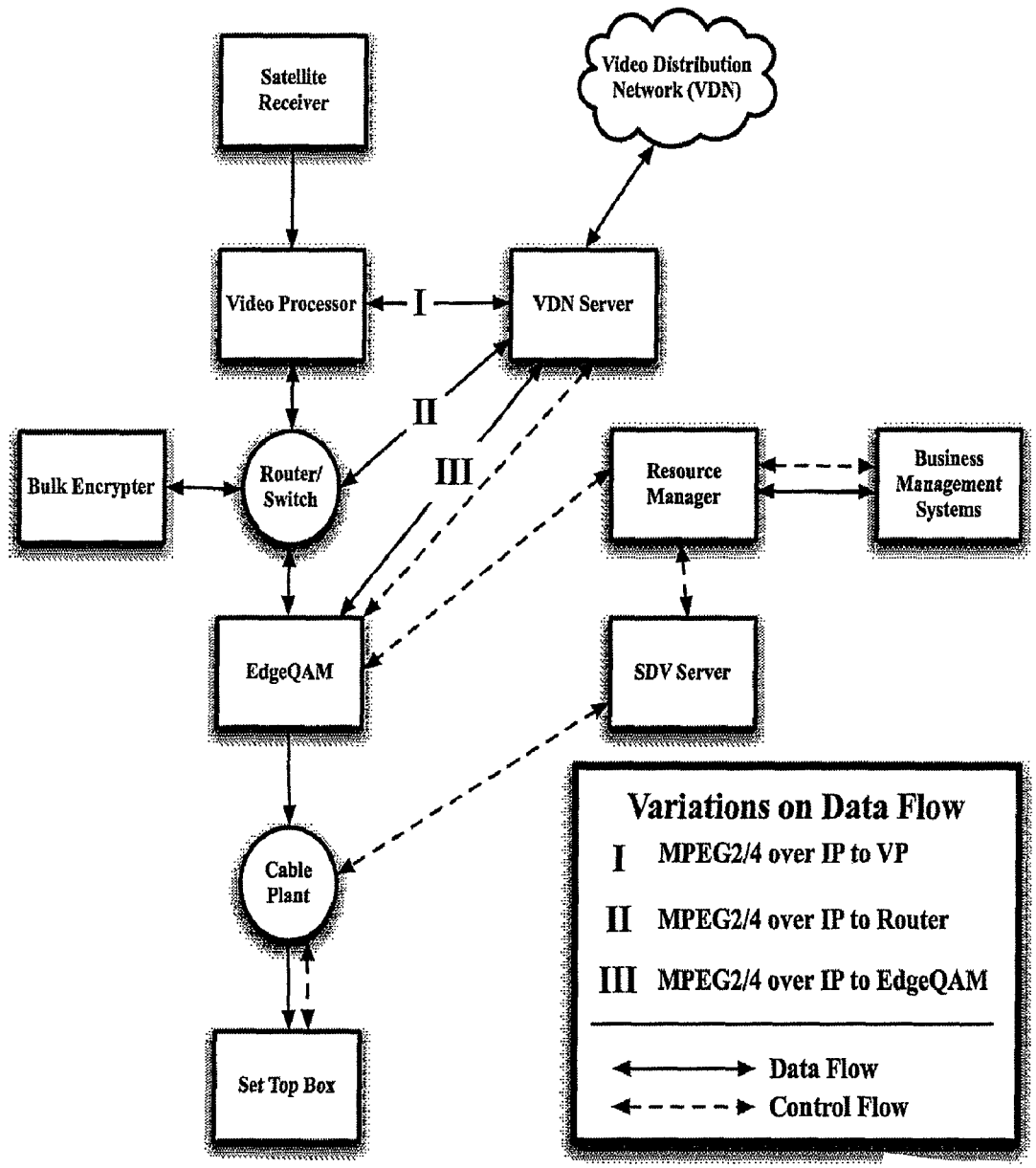
FIG. 9 shows exemplary components of a video distribution system according to still another embodiment of the invention.

FIG. 9 shows an embodiment of the invention where the VDN server directly negotiates with the EdgeQAM. In this case, there is a proprietary connection directly between the VDN server and the EdgeQAM, so that the control signaling regarding the request and allocation of a specific video content can flow on that proprietary connection.

Accordingly, the video or other media content that is available on the Internet is delivered to subscribers using the cable infrastructure. Such Internet video can be delivered via the HFC plant to the subscriber's home so that the content is available directly through the subscribers television or cable set-top box.

The invention enables a cable or telco video service provider to receive programming on demand:
   a. Massively scale the number of potential channels offered to subscribers because the number is no longer limited by transport capacity.
   b. Creates a new cost-effective business model for the service providers since they only pay for the content "by the drink" versus the current model where they pay for the total bundle of channels whether they are being viewed or not.
   c. Expand the number of channels without requiring a similar expansion of the capacity of the infrastructure, i.e. video processing, routing and switching, bulk encryption, EdgeQAM modulation and HFC plant.
   d. The stream will only flow to the cable company when demanded, assuming the VDN supports this dynamic transport service.

The service provider can also add new sources of content dynamically and with simplified provisioning and far less complexity. Another feature relates to broadcasting a VDN-specific iPG and search interface on all VDN allocated channels, thereby enabling subscribers to request a specific VDN program from the iPG/search interface on an VDN channel.

Various embodiments and aspects of the system and method described herein offers the following features:
   1. Provide cost effective delivery of a massive number of channels over limited HFC bandwidth to a cable or telco television audience.
   2. Support Interactive applications like social networking and ecommerce through the television interface.
   3. Enable a market for niche TV programming providers to cost-effectively reach the broadcast TV audience.
   4. Broadcast infrastructure equipment providers do not have to process all of the delivered content, reducing capex, as well as improving both revenue and making cost variable to demand.
   5. Increasing revenue opportunity for Telco and cable TV providers through the delivery of any content and matching content cost to revenue.
   6. Enable television delivery systems to deliver any content to any subscriber only when requested by the subscriber at a time of their choosing, and to do so easily, flexibly and at a lower cost than was possible before.

The invention claimed is:

1. A system for delivery of content from one or more content sources to a plurality of subscriber units, comprising:
   a flow transport subsystem that transports content flows originated from the one or more content sources over a wide area network in response to one or more requests for deadline-driven content flows, wherein the deadline-driven content flows are transported over parallel overlay networks running over an underlying IP network, said parallel overlay networks sharing state information with each other; said state information being associated with multiple identified flows amongst at least two overlay processes that maintain at least two overlay networks;
   one or more gateways that interface with the flow transport subsystem for receiving deadline-driven content flows, each of the one or more gateways being associated with one or more subscriber units, said one or more gateways being selected based on one or more requests for deadline-driven content flows;
   a content processor that converts the deadline-driven content flows to modulated content flows;
   a flow delivery subsystem that delivers the modulated content flows to one or more subscriber units associated with a selected gateway over an allocated frequency bandwidth of one or more transmission mediums, wherein the flow delivery subsystem delivers the modulated content flows only to those one or more subscriber units that generate one or more content requests which initiate the one or more requests for deadline-driven content flow; and
   a request processing node that receives at least one request from one or more subscriber units and routes such request to the selected gateway, wherein the selected gateway initiates a content request to one of the plurality of content sources over the wide area network.

2. The system of claim 1, wherein a request for a deadline-driven content flow is initiated only if a modulated content flow corresponding to the requested deadline-driven content flow is not delivered to another subscriber unit associated with the selected gateway.

3. The system of claim 1, wherein each of the one or more subscriber units executes a program guide process providing a subscriber interface for selection of programs associated with one or more deadline-driven content flows, said program guide process being responsive to a subscriber input for generating a content request for a selected program.

4. The system of claim 3, further including a resource controller that associates one or more communication channels over the allocated frequency bandwidth for delivery of the selected program only if another communication channel is not already associated with the selected program.

5. The system of claim 1, wherein the flow delivery subsystem comprises a switched digital video network.

6. The system of claim 1, wherein the deadline-driven content flows are transported according to an IP protocol.

7. The system of claim 1, wherein the wide area network comprises the Internet.

8. The system of claim 1, wherein the deadline-driven content flows are transported over an overlay network running over an underlying IP network.

9. The system of claim 7, wherein the underlying IP network is the Internet.

10. The system of claim 1, wherein the one or more gateways are implemented to interface with a flow transport protocol associated with the flow transport subsystem, a flow delivery protocol associated with the flow delivery subsystem and another protocol that interfaces between the flow transport protocol and flow delivery protocol.

11. The system of claim 1, wherein at least one content request is deadline-driven request.

12. The system of claim 1, wherein at least one request for deadline-driven content flow is a deadline-driven request.

13. The system of claim 1, wherein at least one deadline-driven content flow is transported according to a multicast protocol.

14. The system of claim 1, wherein the one or more transmission mediums comprise at least one of a coaxial link, a fiber optic link, a copper link or a wireless link.

15. The system of claim 1, wherein at least one transmission medium comprises a last-mile flow delivery network.

16. The system of claim 1, wherein the modulated content flows are delivered to the subscriber units over the allocated frequency bandwidth according to at least one or more versions of PSK, QAM, APSK, OFDM or COFDM modulation.

17. The system of claim 1, wherein a deadline-driven content flow comprise Internet video.

18. The system of claim 1, wherein at least one of the one or more subscriber units comprises a set top box associated with a cable service or a game unit.

19. The system of claim 1, wherein the flow delivery subsystem comprises a hybrid fiber-coax plant.

20. The system of claim 1, wherein at least one deadline-driven content flow comprise an MPEG flow.

21. The system of claim 1, wherein at least one gateway is located at a cable head-end or video hub.

22. The system of claim 1, wherein the one or more content flows comprise non-deadline-driven content and deadline-driven content flows.

23. The system of claim 22, wherein one or more non-deadline-driven content flows comprise TCP/IP flows.

24. A flow delivery system that delivers modulated content flows to subscriber units over an allocated frequency bandwidth of one or more transmission mediums, comprising:
- a gateway associated with a plurality of subscriber units that interfaces with a transport system that transports deadline-driven content flows from one or more content sources over a wide area network; wherein the deadline-driven content flows are transported over parallel overlay networks running over an underlying IP network, said parallel overlay networks sharing state information with each other said state information being associated with multiple identified flows amongst at least two overlay processes that maintain at least two overlay networks;
- a controller that receives a content flow request from a requesting subscriber unit associated with the gateway, said gateway being selected based on a request for deadline-driven content flow for receiving a requested deadline-driven content flow, said request for deadline-driven content flow being initiated only if a modulated content flow corresponding to the requested deadline-driven content flow is not already delivered to another subscriber unit associated with the gateway, said controller allocating a communication channel over the one or more transmission mediums for delivery of the modulated content flow to the requesting subscriber unit based on the initiation of said request for deadline-driven content flow; and
- a request processing node that receives at least one request from one or more subscriber units and routes such request to the selected gateway, wherein the selected gateway initiates a content request to one of the plurality of content sources over the wide area network.

25. The system of claim 24, further including a session manager process that manages one or more multicast communication sessions for delivering one or more modulated content flows to a group of subscriber units simultaneously.

26. The system of claim 25, further including a resource controller that associates one or more communication channels over the allocated frequency bandwidth for delivery of a selected program associated with one or more deadline-driven content flows only if another communication channel is not already associated with the selected program.

27. The system of claim 25, wherein the modulated content flows are delivered only to those one or more subscriber units that generate one or more content requests.

28. The system of claim 24, wherein the gateway is implemented to interface with a flow transport protocol associated with the flow transport subsystem, a flow delivery protocol associated with the flow delivery subsystem and another protocol that interfaces between the flow transport protocol and flow delivery protocol.

29. The system of claim 24, wherein the request for deadline-driven content flow is a deadline-driven request.

30. The system of claim 24, wherein the deadline-driven content flows are transported according to an IP protocol.

31. The system of claim 24, wherein the wide area network comprises the Internet.

32. The system of claim 24, wherein the deadline-driven content flows are transported over an overlay network running over an underlying IP network.

33. The system of claim 32, wherein the underlying IP network is the Internet.

34. The system of claim 24, wherein deadline-driven content flows are transported according to a multicast protocol.

35. The system of claim 24, wherein the one or more transmission medium comprises at least one of a coaxial link, a fiber optic link, a copper link or a wireless link.

36. The system of claim 24, wherein at least one transmission medium comprises a last-mile flow delivery network.

37. The system of claim 24, wherein the modulated content flows are delivered over the allocated frequency bandwidth according to at least one or more versions of PSK, QAM, APSK, OFDM or COFDM modulation.

38. The system of claim 24, wherein a deadline-driven content flow comprise Internet video.

39. The system of claim 24, wherein the flow delivery subsystem comprises a hybrid fiber-coax plant.

40. The system of claim 24, wherein at least one deadline-driven content flow comprise an MPEG flow.

41. The system of claim 24, wherein the one or more gateways are located in at least one of a cable head-end or a video hub.

* * * * *